(12) United States Patent
Gan et al.

(10) Patent No.: US 7,919,567 B2
(45) Date of Patent: Apr. 5, 2011

(54) OLIGOMERIC HALOGENATED CHAIN EXTENDERS FOR PREPARING EPOXY RESINS

(75) Inventors: Joseph Gan, Strasbourg (FR); Bernd Hoevel, Sinzheim (DE)

(73) Assignee: Dow Global Technologies LLC, Midland, MI (US)

( * ) Notice: Subject to any disclaimer, the term of this patent is extended or adjusted under 35 U.S.C. 154(b) by 1266 days.

(21) Appl. No.: 11/448,366

(22) Filed: Jun. 7, 2006

(65) Prior Publication Data

US 2007/0287811 A1 Dec. 13, 2007

(51) Int. Cl.
*C08F 283/00* (2006.01)

(52) U.S. Cl. .................................................. 525/527

(58) Field of Classification Search .................. 525/527
See application file for complete search history.

(56) References Cited

U.S. PATENT DOCUMENTS

| | | | |
|---|---|---|---|
| 4,186,036 A | 1/1980 | Elms et al. | |
| 4,456,740 A * | 6/1984 | Holubka et al. | 525/528 |
| 4,632,971 A | 12/1986 | Cavitt | |
| 4,710,429 A | 12/1987 | Bogan et al. | |
| 4,727,119 A | 2/1988 | Berman et al. | |
| 4,756,954 A | 7/1988 | Berman et al. | |
| 4,892,925 A | 1/1990 | Wang et al. | |
| 5,212,262 A | 5/1993 | Anderson et al. | |
| 5,405,931 A | 4/1995 | Kohno et al. | |
| 5,886,098 A * | 3/1999 | Ueda et al. | 525/66 |

FOREIGN PATENT DOCUMENTS

| | | |
|---|---|---|
| JP | 60192732 | 1/1985 |
| WO | WO 9612752 | 5/1996 |
| WO | WO 2007075718 | 7/2007 |
| WO | WO 2007075769 | 7/2007 |

OTHER PUBLICATIONS

Chun-Shan Wang et al., "Meta-Bromobiphenol Epoxy Resins: Applications in Electronic Packaging and Printed Circuit Board", Journal of Applied Polymer Science, 1991, 1315-1321, vol. 43, John Wiley & Sons, Inc.

* cited by examiner

*Primary Examiner* — Mark Eashoo
*Assistant Examiner* — Megan McCulley
(74) *Attorney, Agent, or Firm* — Gary C Cohn PLLC

(57) ABSTRACT

An oligomeric halogenated chain extender composition comprising the reaction product of: (a) an excess of a halogenated phenolic compound; and (b) a halogenated epoxy resin; in the presence of (c) a solvent; and a halogenated epoxy resin composition comprising the reaction product of the oligomeric halogenated chain extender composition with an epoxy resin.

27 Claims, No Drawings

OLIGOMERIC HALOGENATED CHAIN EXTENDERS FOR PREPARING EPOXY RESINS

BACKGROUND OF THE INVENTION

The present invention relates to a process for making oligomeric halogenated chain extender compositions and reaction products of such chain extenders, which in turn can be used for making thermally resistant epoxy resin compositions. The thermally resistant epoxy resins, are useful, for example, in electrical laminate applications, such as for the manufacture of printed wiring boards.

There are several commonly used indicators of thermal performance of electrical laminates. One of these is the glass transition temperature ($T_g$) of the cured resin. Another measure is the thermal decomposition temperature ($T_d$) of the cured resin, which is determined using thermogravimetic analysis (TGA). A third indicator is known as "T260", which is the time required for a laminate to begin to decompose when heated to 260° C. A similar indicator is "T288", which measures the decomposition time at 288° C. A fourth, but related, indicator is solder dip resistance, which is the time required for the laminate to begin to delaminate when it is dipped into molten solder at 288° C.

Recently, industry standards have begun to specify that lead-free solders be used to construct electronic devices. The lead-free solders usually melt at higher temperatures than conventional lead-based solders. The use of these solders therefore places greater demands on the thermal stability of the resin phase of the electrical laminate. Conventional resins have not been able to satisfy these added thermal requirements.

Another circumstance that drives the need for better thermal stability is the production of multilayer boards. These are formed by bonding thin pre-processed boards together using prepreg layers. This operation can be repeated several times. With each repetition, the entire board is subjected to a complete thermal cure cycle. As a result, the higher the layer count, the greater is the thermal impact on the inner layer board.

Therefore, it is desirable to provide a resin that can enable the laminate to exhibit the needed thermal properties. Laminates exhibiting a $T_d$ of 310° C. or higher are expected to become standard in the industry. The T260 value should be at least 15 minutes, and preferably at least 30 minutes, but values of an hour or more are especially desired. T288 values in excess of 5 minutes are also desired. The $T_g$ should be 130° C. or more, and preferably at least 150° C.

These thermal properties cannot be achieved at the expense of other desirable attributes of the resin and the laminate. The resin must be easily processed, must have acceptable flow characteristics during the lamination step, and must have the necessary physical properties characteristics need to produce dimensionally stable laminates.

Epoxy resins are widely used to make electrical laminates. The resins are often brominated in order to impart the needed thermal properties to them. An example of such a brominated epoxy resin composition is described in U.S. Pat. No. 5,405,931 to Kohno et al. In the process described in that patent, an oligomer having terminal phenolic groups is prepared by reacting an excess of a halogenated phenolic compound with a glycidyl ether of a halogenated phenolic compound. The oligomerization reaction is performed in a melt of the starting materials. This oligomer is advanced with another epoxy resin and then cured to form the polymer phase of an electrical laminate.

SUMMARY OF THE INVENTION

This invention is a process comprising forming a reaction mixture containing at least one halogenated epoxide-reactive compound and at least one halogenated epoxy resin in the presence of a solvent, and subjecting the reaction mixture to conditions sufficient to form a solution of an oligomer composition in the solvent, wherein the oligomer composition contains terminal epoxide-reactive groups.

This invention is also a process comprising forming a mixture of (1) a solution of a halogenated oligomer composition having terminal epoxide-reactive groups and (2) and epoxy resin, and subjecting the mixture to conditions sufficient to form an advanced, halogenated epoxy resin. This invention is also a process which further comprises curing the advanced, halogenated epoxy resin by reacting it with at least one epoxy curing agent.

This invention is also a solution of a halogenated oligomer composition in a solvent, wherein the oligomer composition has terminal epoxide-reactive groups. The invention also includes a varnish that includes a solvent, the halogenated oligomer composition, at least one epoxy resin and at least one epoxy curing agent.

The invention is in other respects an advanced, halogenated epoxy resin formed by reacting the oligomer composition with an excess of at least one epoxy resin, and a cured epoxy resin formed by reacting the advanced, halogenated epoxy resin with at least one epoxy curing agent.

This invention is also a varnish prepared from the advanced, halogenated epoxy resin. The varnish may contain, in addition to the advanced, halogenated epoxy resin, at least one epoxy curing agent, at least one additional epoxy resin, an inhibitor such as boric acid and the like. The invention is in a further aspect a prepreg having a resin phase that includes the advanced, halogenated epoxy resin, optionally in combination with at least one other epoxy resin. The invention is still further a resin-coated foil or an electrical laminate having a resin phase produced by curing the advanced, halogenated epoxy resin (optionally in combination with at least one other epoxy resin), or mixture of the halogenated oligomer and at least one epoxy resin, with at least one epoxy curing agent.

It has been found that the process of forming the oligomer composition of the invention can have a very significant impact upon the thermal properties of a cured epoxy resin made using the oligomer composition. Using the process of the invention, cured epoxy resins having particularly good thermal properties can be formed. In particular, electrical laminates having T260 values in excess of 15 minutes and in some cases over an hour have been prepared in accordance with the invention. $T_d$ values of greater than 300° C. have been obtained. The cured epoxy resin retains other desirable attributes, including good physical properties (in particular, good toughness together with high $T_g$), good flow control and good adhesion.

DETAILED DESCRIPTION OF THE INVENTION

The oligomer composition of the invention is produced by reacting at least one halogenated epoxide-reactive compound with a halogenated epoxy resin in the presence of a solvent. One or more non-halogenated epoxide-reactive compounds may be used in combination with the halogenated epoxide-reactive compound. Similarly, one or more non-halogenated epoxy resins can be used in combination with the halogenated epoxy resin. The oligomer composition is produced in the form of a miscible mixture in the solvent. The oligomer composition has an average of at least 2.0 terminal epoxide-reactive groups per molecule.

The halogenated epoxide-reactive compound(s) are used in a stoichiometric excess over the epoxy resin to make the oligomer composition. The molar ratios of starting materials are selected such that the oligomer composition has a number average molecular weight of from 600 to 4000, and a weight average molecular weight of from 1200 to 10,000. A preferred number average molecular weight is from 700 to 3200 and a preferred weight average molecular weight is from 1500 to 7000. An especially preferred number average molecular weight is from 800 to 1600 and an especially preferred weight average molecular weight is from 1500 to 3500. These molecular weight values include the contribution of any unreacted epoxide-reactive compounds as may be present in the oligomer composition.

The oligomer composition will typically comprise a mixture of compounds having varying degrees of polymerization. Usually, it will also contain a quantity of unreacted starting materials, mainly the epoxide-reactive compound(s), as they are used in excess. Unreacted epoxy compounds will be present in very small quantities, if at all. In the preferred case in which the oligomer composition is made from difunctional starting materials, the bulk of the weight of the oligomer will consist of molecules containing N repeating units derived from the epoxide-reactive compound and N-1 repeating units derived from the epoxy resin. N can range from 2 to about 50, but preferably is mainly 2 to 10 and most preferably will be mainly from 2-5. Preferred oligomer compositions are those in which the molecules corresponding to N values of 2 or 3 constitute at least 48% of the weight of the oligomer (based on solids, exclusive of any solvent that may be present. Molecules corresponding to N values of 2 or 3 preferably constitute from 48 to 75% by weight of the oligomer. The oligomer composition may contain up to 30% by weight of unreacted epoxide-reactive starting compounds, again on a solids basis.

The oligomer composition may contain from about 10 to about 60% by weight, especially from about 25 to about 55% by weight, and especially from 35 to 55% by weight of halogen atoms. The halogen atoms are preferably chlorine and more preferably bromine. Mixtures of chlorine and bromine can also be used.

The halogenated epoxide-reactive compound contains at least one halogen atom and at least 2 epoxide-reactive groups/molecule. The halogen atoms are preferably chlorine and/or bromine and are most preferably bromine. The compound preferably contains exactly 2 epoxide-reactive groups per molecule.

Epoxide-reactive groups are functional groups that will react with a vicinal epoxide to form a covalent bond. These groups include phenol, isocyanate, carboxylic acid, amino or carbonate groups, although amino groups are less preferred. Phenols are preferred. A phenolic hydroxyl group is any hydroxyl group that is attached directly to an aromatic ring carbon atom.

Suitable halogenated epoxide-reactive compounds include those represented by the structure (I)

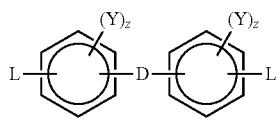

(I)

where each L independently represents an epoxide-reactive group, Y represents a halogen atom, each z is independently a number from 1 to 4 and D is a divalent hydrocarbon group suitably having from 1 to about 10, preferably from 1 to about 5, more preferably from 1 to about 3 carbon atoms, —S—, —S—S—, —SO—, —SO$_2$, —CO$_3$, —CO— or —O—. The preferred halogenated epoxide-reactive compounds are halogenated phenolic compounds in which each L is —OH. Examples of the halogenated phenolic compound include mono-, di-, tri- and tetrachloro-substituted and mono-, di-, tri- and tetrabromo-substituted dihydric phenols such as bisphenol A, bisphenol K, bisphenol F, bisphenol S and bisphenol AD, and mixtures thereof. Tetrabromo-substituted bisphenols are particularly preferred.

If a nonhalogenated epoxide-reactive compound is also used to make the oligomer, it preferably corresponds to structure (I), except each z is zero in this case. Examples include dihydric phenols such as bisphenol A, bisphenol K, bisphenol F, bisphenol S and bisphenol AD, and mixtures thereof.

Epoxide-reactive compounds (either halogenated or non-halogenated) having three or more phenolic groups, such as tetraphenol ethane, may also be used to make the oligomer, although they will usually be used in small quantities such as no greater than 5% of the total weight of the epoxide-reactive compounds.

The epoxide-reactive compound(s) (whether halogenated or not) preferably contain less than 2%, especially less than 1%, by weight of nitrogen. They are most preferably devoid of nitrogen.

The halogenated epoxy resin used to make the oligomer composition contains at least one halogen atom and two or more, preferably exactly two, epoxide groups per molecule. As before, the halogen atoms are preferably chlorine and/or bromine and most preferably are bromine. The halogen atoms are preferably bonded to a carbon atom of an aromatic ring.

The halogenated epoxy resin used to make the oligomer composition may be a saturated or unsaturated aliphatic, cycloaliphatic, aromatic or heterocyclic compound. It can be substituted with one or more substituents such as lower alkyl. The halogenated epoxy resin may have an epoxy equivalent weight of about 150 to about 3,500, preferably about 160 to about 1000, more preferably from about 170 to about 500. Suitable halogenated epoxy resins are well described in, for example, U.S. Pat. Nos. 4,251,594, 4,661,568, 4,710,429, 4,713,137, and 4,868,059, and *The Handbook of Epoxy Resins* by H. Lee and K. Neville, published in 1967 by McGraw-Hill, New York, all of which are incorporated herein by reference.

A preferred type of halogenated epoxy resin is a diglycidyl ether of a polyhydric phenol. Suitable epoxy resins include those represented by the structure (II)

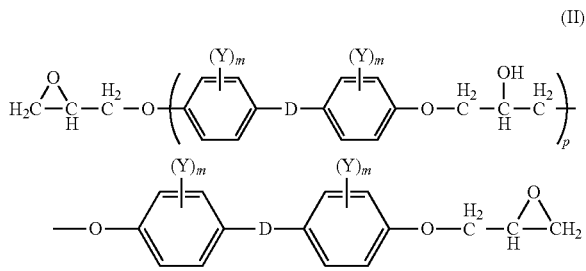

(II)

wherein each Y is independently a halogen atom, each D is a divalent group as described with respect to structure (I), m may be 1, 2, 3 or 4 and p is a number from 0 to 5, especially from 0 to 2. Examples of the halogenated epoxy resins include mono-, di-, tri- and tetrachloro-substituted and mono-, di-, tri- and tetrabromo-substituted diglycidyl ethers of dihydric phenols such as bisphenol A, bisphenol K, bisphenol F, bisphenol S and bisphenol AD, and mixtures thereof. Tetrabromo-substituted epoxy resins are particularly preferred. Diglycidyl ethers of tetrabromobisphenol A and derivatives thereof are commercially available from The Dow Chemical Company under the trade names D.E.R.® 542 and D.E.R.® 560.

Mixtures of halogenated and non-halogenated epoxy resins can be used to make the oligomer. Suitable non-halogenated epoxy resins include, for example, the diglycidyl ethers of polyhydric phenol compounds such as resorcinol, catechol, hydroquinone, bisphenol, bisphenol A, bisphenol AP (1,1-bis(4-hydroxylphenyl)-1-phenyl ethane), bisphenol F, bisphenol K, tetramethylbiphenol, diglycidyl ethers of aliphatic glycols and polyether glycols such as the diglycidyl ethers of $C_{2-24}$ alkylene glycols and poly(ethylene oxide) or polypropylene oxide) glycols; polyglycidyl ethers of phenolformaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof.

Suitable diglycidyl ethers of polyhydric phenolic compounds correspond to those represented by structure II above, in which m is zero. Many are commercially available, including diglycidyl ethers of bisphenol A resins such as are sold by Dow Chemical under the designations D.E.R.® 330, D.E.R.® 331, D.E.R.® 332, D.E.R.® 383, D.E.R. 661 a D.E.R.® 662 resins.

Commercially available diglycidyl ethers of polyglycols that are useful as the non-halogenated epoxy resin include those sold as D.E.R.® 732 and D.E.R.® 736 by Dow Chemical.

Epoxy novolac resins can be used as the nonhalogenated epoxy resin, but tend to be less preferred because they have epoxide functionalities in excess of 2.0. Such resins are available commercially as D.E.N.® 354, D.E.N.® 431, D.E.N.® 438 and D.E.N.® 439 from Dow Chemical.

Other suitable additional epoxy resins are cycloaliphatic epoxides. A cycloaliphatic epoxide includes a saturated carbon ring having an epoxy oxygen bonded to two vicinal atoms in the carbon ring, as illustrated by the following structure III:

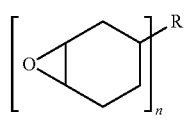

(III)

wherein R is an aliphatic, cycloaliphatic and/or aromatic group and n is a number from 1 to 10, preferably from 2 to 4. When n is 1, the cycloaliphatic epoxide is a monoepoxide. Di- or polyepoxides are formed when n is 2 or more. Mixtures of mono-, di- and/or polyepoxides can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl) adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as that sold commercially as D.E.R. 592 and D.E.R. 6508 (Dow Chemical) can be used.

The non-halogenated resin preferably corresponds to structure II in which each m is zero. Examples of the nonhalogenated epoxy resins include diglycidyl ethers of dihydric phenols such as bisphenol A, bisphenol K, bisphenol F, bisphenol S and bisphenol AD, and mixtures thereof.

The halogenated epoxy resin and the additional epoxy resin, when used, are preferably mainly difunctional. If higher-functionality epoxy resins (whether halogenated or not) are used to make the oligomer, they are preferably used in small quantities, such as to about 5% by weight of total weight of the epoxy resins used in making the oligomer composition.

The epoxide-reactive compound(s) and epoxy resin(s) are reacted in the presence of a solvent. The solvent is a material in which the reactants and the oligomer composition are soluble, at the temperature of the oligomerization reaction. The solvent is not reactive with the epoxide-reactive compound(s) or the epoxy resin(s) used to make the oligomer composition, under the conditions of the oligomerization reaction. The solvent (or mixture of solvents, if a mixture is used) preferably has a boiling temperature that is at least equal to and preferably higher than the temperatures employed to conduct the oligomerization reaction. A boiling temperature of from 100 to 150° C. is especially suitable. Suitable solvents include, for example, glycol ethers such as ethylene glycol methyl ether and propylene glycol monomethyl ether; glycol ether esters such as ethylene glycol monomethyl ether acetate and propylene glycol monomethyl ether acetate; polyethylene oxide ethers and polypropyleneoxide ethers; polyethylene oxide ether esters and polypropylene oxide ether esters; amides such as N,N-dimethylformamide; aromatic hydrocarbons toluene and xylene; aliphatic hydrocarbons; cyclic ethers; halogenated hydrocarbons; and mixtures thereof. Preferred solvents include propylene glycol methyl ether acetate and propylene glycol monomethyl ether, which are commercially available from The Dow Chemical Company as Dowanol™ PMA and Dowanol™ PM, respectively. These, can be used alone or in combination with another solvent, such as methyl ethyl ketone.

The solvent is present in an amount such that it constitutes at least 5% by combined weight of the solvent and starting materials (i.e., epoxide-reactive compound(s) and epoxy resin(s). Preferably, the solvent constitutes from 10 to 75% of the weight of the mixture, and more preferably constitutes from 15 to 60% of the weight of the mixture.

The oligomer composition is formed by bringing the mixture of solvent, the starting epoxide-reactive compound(s) and the starting epoxy resin(s) to a temperature above their respective melting temperatures, and permitting them to react until the epoxy groups on the epoxy resins are consumed. The starting materials can be mixed in any order provided that the solvent is present when reaction conditions are achieved. The reaction can be conducted at a temperature of about 100° to about 200° C., preferably about 110° to about 180° C., for a period of about 0.3 to about 4 hours, preferably about 1 to about 3 hours. The progress of the reaction can be followed by monitoring for epoxy content.

The oligomerization is preferably conducted in the presence of one or more catalysts for the reaction of epoxide groups with phenolic groups. Suitable such catalysts are described in, for example, U.S. Pat. Nos. 3,306,872, 3,341, 580, 3,379,684, 3,477,990, 3,547,881, 3,637,590, 3,843,605, 3,948,855, 3,956,237, 4,048,141, 4,093,650, 4,131,633, 4,132,706, 4,171,420, 4,177,216, 4,302,574, 4,320,222, 4,358,578, 4,366,295. and 4,389,520, all incorporated herein by reference. Examples of suitable catalysts are imidazoles such as 2-methylimidazole; 2-ethyl-4-methylimidazole; 2-phenyl imidazole; tertiary amines such as triethylamine, tripropylamine and tributylamine; phosphonium salts such as ethyltriphenylphosphonium chloride, ethyltriphenylphosphonium bromide and ethyltriphenyl-phosphonium acetate; ammonium salts such as benzyltrimethylammonium chloride and benzyltrimethylammonium hydroxide; and mixtures thereof The amount of the catalyst used generally ranges from about 0.001 to about 2 weight percent, and preferably from about 0.01 to about 1 weight percent, based on the total weight of the epoxide-reactive compounds and epoxy resins used to make the oligomer.

The oligomer composition prepared in this manner surprisingly exhibits excellent solubility in organic solvents such as propylene glycol monomethyl ether acetate and propylene glycol monomethyl ether. Similar oligomer compositions which are made in a fusion reaction process as described in U.S. Pat. No. 5,405,931 tend to form turbid solutions which often phase separate upon standing, indicating that the oligomeric composition contains some insoluble fraction.

The halogenated oligomeric composition is useful as a chain extender or crosslinker for advancing epoxy resins. It can also be used as a reactive or non-reactive additive such as a flame retardant in thermoplastics.

To make a highly thermally resistant halogenated epoxy resin composition useful for preparing electrical laminates, the oligomer composition is reacted with at least one additional epoxy resin to form an advanced resin, which can then be cured with one or more epoxy curing agents.

The additional epoxy resin has an average of more than one epoxy group per molecule. It preferably contains two or more epoxy groups/molecules, and more preferably contains more than 2 epoxy groups/molecule.

The additional epoxy resin may be the same epoxy resin that is used to make the oligomeric composition, or may be a different resin. Higher functionality epoxy resins can be tolerated during the advancement step. It is preferably not halogenated, as the presence of halogen atoms in the additional epoxy resin can cause undesired reactions with the epoxy curing agent and/or catalysts. The additional epoxy resin(s) may have an average epoxide functionality of 2 or greater, preferably at least 2.5 and more preferably at least 3. The use of a higher functionality epoxy resin in this step leads to a cured resin having a higher crosslink density, which tends to lead to better thermal properties. Suitable epoxy resins include glycidyl ethers of phenolic compounds such as resorcinol, catechol, hydroquinone, bisphenol, bisphenol A, bisphenol AP (1,1-bis(4-hydroxylphenyl)-1-phenyl ethane), bisphenol F and bisphenol K. Preferred additional epoxy resins having an average of greater than 2 epoxy groups/molecule include cresol-formaldehyde novolac epoxy resins, phenol-formaldehyde novolac epoxy resins, bisphenol A novolac epoxy resins, tris(glycidyloxyphenyl)methane, tetrakis(glycidyloxyphenyl)ethane, tetraglycidyl diaminodiphenylmethane and mixtures thereof. Tris(glycidyloxyphenyl)methane, tetrakis(glycidyloxyphenyl)ethane and tetraglycidyldiaminodiphenylmethane are preferred when a low viscosity resin is desired. In view of cost performance, cresol-formaldehyde novolac epoxy resins, phenol-formaldehyde novolac epoxy resins and bisphenol A novolac epoxy resins or a mixture of these epoxy resins are of interest as the additional epoxy resin.

Epoxy novolac resins are of particular interest as the additional epoxy resin. These resins suitably have an epoxy equivalent weight of from about 150 to 250, especially from 160 to 210. Such resins are available commercially as D.E.N. 354, D.E.N. 431, D.E.N. 438 and D.E.N. 439 from Dow Chemical.

The ratios of the halogenated oligomer composition and the additional epoxy resin are selected such that an epoxy-terminated advanced resin is formed having a desired epoxy equivalent weight and a desired halogen content. A stoichiometric excess of the additional epoxy resin is needed in order to obtain an epoxy-terminated material. The epoxy equivalent weight of the advanced resin may be from 150 to 10,000 or more, preferably from 150 to 2000 and especially from 150 to 400. The halogen content of the advanced resin is suitably from about 10 to about 35, preferably from about 12 to about 23, most preferably from about 14 to about 18 weight percent.

The advanced resin is conveniently prepared by heating a mixture of the oligomer composition and additional epoxy resin in the presence of a suitable catalyst. It is not necessary to remove the solvent from the halogenated oligomer before conducting the advancement reaction, and in fact it is preferred that this solvent remains present. Additional solvents may be present if desired, although volatile materials that will evaporate at the reaction temperature are preferably avoided. The reaction is continued until the desired epoxy equivalent weight is obtained. The advanced material may include a mixture of unreacted additional epoxy resin and the halogenated oligomer composition/additional epoxy resin reaction product.

Suitable reaction conditions are generally the same as described for the preparation of the oligomer composition.

The resulting advanced epoxy resin is suitable in a variety of epoxy resin applications, either by itself or as a blend with one or more other epoxy resins. An application of particular interest is the preparation of electrical laminates. For that application, a varnish is typically prepared by diluting the advanced epoxy resin in a suitable solvent. The varnish will also contain at least one epoxy curing agent and at least one catalyst for the curing reaction.

The particular curing agent used is not particularly critical and therefore a wide variety of curing agents can be used. However, the selection of curing agent may affect thermal properties of the cured resin. These include amine curing agents such as dicyandiamide, diaminodiphenylmethane and diaminodiphenylsulfone; anhydrides such as hexahydroxyphthalic anhydride, copolymers of styrene-maleic acid anhydride; phenolic curing agents such as phenol novolac, bisphenol A novolacs; and mixtures thereof. Other curing agents useful in the present invention are described in U.S. Published Patent Application No. 2004/0101689, incorporated herein by reference. The amount of the curing agents used will normally range from about 0.3 to about 1.5, especially from about 0.8 to about 1.2, equivalent per epoxy equivalent of the epoxy component(s) in the advanced resin.

Similarly, a wide range of catalysts can be used in the varnish composition, including those described before with respect to the preparation of the oligomer. Suitable catalyst amounts are as described before, as well.

The varnish will include a solvent or a mixture of solvents. The solvent used for the epoxy resin composition may be the same material as that used to prepare the oligomer composition, as described above, or may be a different material. In particular, lower-boiling solvents may be used in the varnish, as the solvent usually will be removed during the curing process.

The varnish may also contain an inhibitor to help control reactivity and in some cases to further increase the glass transition temperature of the cured system. Suitable such inhibitors include Lewis acids such as boric acid, boron oxide and boron esters, as described in U.S. Pat. Nos. 5,314,720 and 6,613,639.

The varnish may also include other additives such as pigments, dyes, fillers, surfactants, flow modifiers, flame retardants and mixtures thereof.

Alternatively, a varnish can be prepared in similar manner, using a mixture of the halogenated epoxide-reactive oligomer and an epoxy resin instead of (or in addition to) the halogenated, advanced epoxy resin. Such a varnish fill also contain at least one epoxy curing agent as described before, and may contain other additives (such as catalysts) as discussed before.

To produce an electrical laminate, the varnish is impregnated into a substrate or web. The obtained impregnated substrate is dried at, for example, about 80° C. to about 200° C., and preferably about 100° C. to about 200° C.; for about 0.5 minute to about 60 minutes, and preferably about 0.5 minute to about 30 minutes, to remove solvents and form a prepreg. Drying conditions are selected to minimize curing of the resin. The substrates used herein include, for example, glass cloth, a glass fiber, glass paper, carbon fiber, carbon fiber matts, paper, and similar substrates of aramid, polyamide, polyimide, polyester, and other thermally stable polymeric fibers.

The obtained prepreg is cut into a desired size. Multiple sections of the cut prepregs (for example, 2 to 10 pieces) are stacked and laminated by application of pressure and elevated temperature, such as, for example, about 10 to about 50 Kg/cm$^2$, and about 130° C. to about 220° C., for about 0.5 to about 3 hours to cure the resin and obtain a laminate. An electrical conductive layer is formed on the laminate with an electrical conductive material. Suitable electrical conductive materials used herein include, for example, electrical conductive metals such as copper, gold, silver, platinum and aluminum.

The electrical laminates manufactured as described above can be used as metal-clad laminates and multi-layer printed circuit boards for electrical or electronic equipment.

The use of a halogenated oligomer prepared in the solvent has been found to lead to improvements in the thermal properties of the cured resin and the resulting laminate. Generally, the $T_g$ of the laminate is from about 130° C. to about 220° C., and preferably from about 140° C. to about 190° C., and more preferably from about 150° C. to 190° C.

Laminates prepared using the epoxy resin composition of the invention also tend to exhibit high $T_d$ values, although these can vary significantly depending on the choice of particular starting materials. $T_d$ stands for temperature of thermal degradation measured by thermal gravimetrical analysis (CGA). The sample is heated at a rate of 10° C./min, and the weight of the sample is followed. The $T_d$ value is the temperature at which the sample has lost 5 weight percent of its original weight.

In many cases, $T_d$ values of from about 300° C. to about 400° C., preferably from about 320° C. to about 380° C. and more preferably about 330° C. to 370° C., can be obtained.

T260 is determined by thermogravimetric analysis (TMA). The sample is heated to 260° C. and held at that temperature until such time as a measurable change in sample thickness, as a result of thermal decomposition, is detected. T260 values are preferably at least 15 minutes, more preferably at least 30 minutes and especially 60 minutes or more. T288 is measured in the same way, except the sample is heated to 288° C. T288 values of 5 minutes or more are preferred.

Solder dip is a rapid test that provides an indication of how an electrical laminate will withstand soldering conditions. The laminate is dipped into molten lead-free solder at 288° C. The sample is held in the solder until delamination is caused by decomposition of the resin. The time at which decomposition begins is the solder dip value. Solder dip values of at least 100 seconds are preferred.

This invention also permits laminates to be formed having very low dielectric properties, as indicated by $D_k$ and $D_f$. Laminates made in accordance with the invention often exhibit a $D_k$ of less than about 4.3, preferably less than about 4.2 and more preferably less than 4.0 at 1 MHz. The $D_f$ of the laminate is often less than about 0.020, preferably less then about 0.015 and more preferably less than about 0.010, at 1 MHz.

Laminates made in accordance with the invention also tend to resist delamination.

The halogenated oligomer of the invention can also be used as a component in an adhesive coating for metallic foils, such as copper foils. In one embodiment, the coating composition includes the halogenated oligomer, at least one epoxy resin and at least one epoxy curing agent. In another embodiment, the coating composition includes an advanced, halogenated epoxy resin as described above, optionally at least one additional epoxy resin, and at least one epoxy curing agent. Methods for applying and curing coatings onto metal foils are described, for example, in U.S. Pat. No. 6,432,541.

The present invention will be described in more detail with reference to the following Examples and Comparative Samples, which are not to be construed as limiting. Unless otherwise indicated, all parts and percentages are by weight.

Various terms and designations for the materials used in the following Examples are explained as follows:

D.E.R. 330 epoxy resin is a diglycidylether of bisphenol A with an epoxy equivalent weight (EEW) of 180, commercially available from The Dow Chemical Company.

D.E.N. 438 is a phenol novolac epoxy resin having epoxy equivalent weight of 180, commercially available from The Dow Chemical Company.

D.E.R. 560 is a brominated diglycidyl ether of bisphenol A having an epoxy equivalent weight of about 452, available from The Dow Chemical Company.

D.E.R. 592A80 is a brominated advanced epoxy resin, commercially available from The Dow Chemical Company.

"TBBA" stands for tetrabromobisphenol-A.

D.E.R. 542 is a brominated epoxy resin having an epoxy equivalent weight of 330, commercially available from The Dow Chemical Company.

SD 500 C is a bisphenol A novolac, sold by Borden Chemical Company.

Dowanol® PMA is a propylene glycol monomethyl ether acetate, commercially available from The Dow Chemical Company.

Dowanol® PM is a propylene glycol monomethyl ether, commercially available from The Dow Chemical Company.

Various experimental testing and analytical methods used for various measurements in the following Examples are as follows:

DSC stands for differential scanning colorimetry. $T_g$ is the mid point $T_g$ by DSC, measured using a heating rate is 10° C./minute for films and 20° C./minute for laminates.

DMTA stands for dynamic mechanical thermal analysis. $T_g$ is measured at a heating rate of 10° C./minute to 280° C. with a oscillation rate of 10 Hz.

The stroke cure reactivity of resins is measured by blending the resin solution with a catalyst and a hardener and reacting them on the surface of a 170° C. hot plate. Reactivity is reported as the elapsed time required for gelation.

Examples 1 and 2 Comparative Examples A and B

Oligomer Example 1 is prepared by charging 28.8 parts of D.E.R. 542 epoxy resin, 71.2 parts of TBBA and 42.8 parts of Dowanol PMA to a 1 liter glass reactor equipped with a mechanical stirrer, a heating jacket, a nitrogen inlet and a condenser. The reactor contents are heated to 110° C. to form a resin solution. 1500 ppm of ethyltriphenylphosphonium acetate catalyst, based on the combined weight of the epoxy resin and TBBA, is added to the resin solution. The solution is then heated to 130° C. and held at that temperature until the epoxy content is reduced to less than 0.5 percent (approximately 90-120 minutes). Additional DOWANOL PMA is added to cool the resulting resin solution.

Oligomer Example 2 is prepared in the same manner, except for the proportions of starting materials, which are as indicated in Table 1.

Comparative Sample A is prepared in by charging 28.8 parts of D.E.R. 542 epoxy resin and 71.2 parts TBBA to the reactor. The reaction mixture is heated to 150° C. and stirred under a nitrogen atmosphere until a transparent liquid forms. 1500 ppm of ethyltriphenylphosphonium acetate catalyst is added, with the temperature being controlled to below 170° C. during the catalyst addition. The mixture is then cooled to 150° C. and held at that temperature for one hour. The brominated phenolic oligomer is then cooled and flaked as a solid.

Comparative Sample B is prepared in the same manner as Comparative Sample A, except for the proportions of starting materials, which are as indicated in Table 1.

The phenolic equivalent weight, melt viscosity at 150° C., $T_g$ (by DSC), solubility in the Dowanol PMA solvent, molecular weights and product distribution are determined for each of Examples 1 and 2 and Comparative Samples A and B. Results are as indicated in Table 1.

TABLE 1

| Components | Example 1 | Comparative Sample A* | Example 2 | Comparative Example B* |
|---|---|---|---|---|
| D.E.R. 542, pbw[1] | 28.8 | 28.8 | 37.75 | 37.75 |
| TBBA, pbw[1] | 71.2 | 71.2 | 62.25 | 62.25 |
| DOWANOL PMA, pbw[1] | 42.8 | 0 | 70 | 0 |
| Phenolic E.W. | 542 | 563 | 874 | 873 |
| $T_g$, ° C. | 62[4] | 80 | 88[4] | 99 |
| Solubility[2] | Soluble | Partially soluble | Soluble | Partially soluble |
| $M_n$ | 811 | 822 | 1194 | 1185 |
| $M_w$ | 1501 | 1735 | 2542 | 2797 |
| $M_z$ | 2571 | 3254 | 4428 | 5097 |
| Polydispersity | 1.85 | 2.11 | 2.13 | 2.36 |
| Free TBBA, wt-% | 35 | 36 | 18 | 20 |
| 2:1 Adduct[3], wt-% | 33 | 26 | 25 | 22 |
| 2:2 Adduct[3], wt-% 3 | 20 | 19 | 23 | 20 |
| 4:3 Adduct[3] wt-% | 8 | 10 | 15 | 15 |
| Highers | 4 | 9 | 19 | 23 |
| Melt Viscosity @ 150° C., Pa | 3.8[4] | 10.4 | 65[4] | >100[5] |

*Not an example of the invention.
[1]Parts by weight of respective starting materials.
[2]Solubility in ethylene glycol monomethyl ether acetate.
"Soluble" means a clear solution is obtained at room temperature.
"Partially soluble" indicates that a turgid solution that partially phase separates over time is obtained at room temperature.
[3]A 2:1 adduct is the reaction product of 1 mole of epoxy resin and 2 moles of TBBA. A 3:2 adduct is the reaction product of 2 moles of epoxy resin and 3 moles of TBBA. A 4:3 adduct is the reaction product of 3 moles of epoxy resin with 4 moles of TBBA. Highers are 5:4 and higher adducts.
[4]Evaluated after drying the oligomer composition for 2 hours at 150° C. followed by drying for 1 hour under vacuum.
[5]Sample is too viscous to measure accurately at this temperature.

The results summarized in Table 1 show how the method of oligomer preparation affects the composition and properties of the oligomer. $M_n$ and phenolic equivalent weight remain essentially unchanged, whereas $M_w$, $M_z$ and polydispersity are all reduced. Viscosity is also reduced significantly. The solvent preparation process used to produce Examples 1 and 2 produces lower amounts of higher molecular weight (4:3) adducts that are formed. The $T_g$ of the oligomer is also lower when it is produced in the solvent preparation process.

Examples 3-10

Oligomer Example 3 is prepared in the same general manner described with respect to the preparation of halogenated oligomer Examples 1 and 2, using proportions of starting materials as indicated in Table 2.

Oligomer Example 4 is prepared in the same manner as Oligomer Examples 1 and 2, except that after the TBBA/D.E.R.542 mixture has reacted, a small quantity of a non-halogenated epoxy resin, D.E.R.330, is added and allowed to react to increase the molecular weight of the oligomer. Proportions of starting materials are as indicated in Table 2.

Oligomer Example 5 is prepared in the same manner as Oligomer Example 4, using proportions of starting materials as indicated in Table 2.

Oligomer Example 6 is prepared in the same general manner described with respect to Examples 1 and 2, using proportions of starting materials as indicated in Table 2.

Oligomer Examples 7 and 8 are prepared in the same general manner described with respect to Examples 1 and 2, except that a mixture of D.E.R. 542 and a non-halogenated epoxy resin (D.E.R. 330) is used to make the oligomer. Proportions of starting materials are as indicated in Table 2.

Oligomer Example 9 is prepared by charging D.E.R. 560 halogenated epoxy resin, TBBA and propylene glycol monomethyl ether (Dowanol® PM from Dow Chemical) to a 1 liter glass reactor equipped with a mechanical stirrer, a heating jacket, a nitrogen inlet and a condenser. The reactor contents are heated to 90° C. to form a resin solution. 1500 ppm of ethyltriphenylphosphonium acetate catalyst, based on the combined weight of the epoxy resin and TBBA, is added to the resin solution. The solution is then heated to 110° C. and held at that temperature until the epoxy content is reduced to less than 0.5 percent (approximately 240-300 minutes). Proportions of starting materials are as indicated in Table 2.

Oligomer Example 10 is made in the same manner as Oligomer Example 9, except that a small amount of a nonhalogenated resin (D.E.R. 330) is added with the other reactants. Proportions of starting materials are as indicated in Table 2.

After the oligomer composition is formed in each case, D.E.N 438 epoxy novalac resin is added in the amount indicated in Table 2, and the mixture is heated to 110° C. Ethyltriphenylphosphonium acetate catalyst is added in the amounts indicated in Table 2, and the mixture is heated to 140° C. (110° C. for Examples 9 and 10) and held at that temperature until the indicated epoxy equivalent weight is obtained. Additional solvent is then added as indicated in Table 2.

The equivalent weight, bromine content and % solids of the resulting advanced resins are as indicated in Table 2.

TABLE 2

| | Ex. No. | | | | | | | |
|---|---|---|---|---|---|---|---|---|
| | 3 | 4 | 5 | 6 | 7 | 8 | 9 | 10 |
| Oligomer Preparation | | | | | | | | |
| D.E.R. 542, pbw | 10.07 | 6.32 | 7.9 | 5.87 | 7.039 | 10.06 | 0 | 0 |
| D.E.R. 330, pbw | 0 | 5.19 | 2.2 | 0 | 2.10 | 3.14 | 0 | 0.587 |
| D.E.R. 560, pbw | 0 | 0 | 0 | 0 | 0 | 0 | 7.04 | 7.42 |
| TBBA, pbw | 12.44 | 15.62 | 13.0 | 14.51 | 13.57 | 19.48 | 12.63 | 13.3 |
| DOWANOL PMA, pbw | 5.63 | 7.37 | 7.0 | 6.8 | 13.34 | 19.5 | 0 | 0 |
| DOWANOL PM, pbw | 0 | 0 | 0 | 0 | 0 | 0 | 4.94 | 5.32 |
| Catalyst | 0.045 | 0.045 | 0.045 | 0.03 | 0.03 | 0.045 | 0.03 | 0.03 |
| Advancement Reaction | | | | | | | | |
| D.E.N. 438 | 52.43 | 53.6 | 57.7 | 53.8 | 53.90 | 37.32 | 62.3 | 60.65 |
| Catalyst | 0.04 | 0.04 | 0.04 | 0.0375 | 0.04 | 0.04 | 0.04 | 0.04 |
| DOWANOL PMA | 19.35 | 6.9 | 0 | 4.95 | 0 | 0 | 0 | 0 |
| Acetone | 0 | 5 | 12.2 | 14 | 10.16 | 10 | 0 | 0 |
| Dowanol PM | 0 | 0 | 0 | 0 | 0 | 0 | 13.1 | 12.7 |
| Advanced Resin properties | | | | | | | | |
| EEW | 272 | 282 | 280 | 286 | 276 | 381 | 260 | 266 |
| Bromine content, wt % based on solids | 16 | 15 | 14 | 15 | 15.1 | 23 | 13.3 | 14.0 |
| Solid content, % | 75 | 80 | 80 | 75 | 75 | 70 | 80 | 80 |

Varnishes are prepared by separately blending advanced epoxy resin Examples 3-10 with a hardener solution, boric acid solution and catalyst solution for about 60 minutes at room temperature. The hardener solution is prepared by blending dicyandiamide (10 wt. %) at room temperature with Dowanol® PM (45 wt. %) and dimethylformamide (45 wt. %). The boric acid solution is prepared by blending boric acid (20 wt. %) at room temperature with methanol (80 wt. %). The catalyst solution is prepared by blending 2-ethyl, 4-methyl imidazole (20 wt. %) or 2-phenylimidazole (20 wt. %) at room temperature with methanol (80 wt. %). The bisphenol A novolac solution is prepared by blending (43%) of the bisphenol A novolac resin with Dowanol® PMA (28.5 wt. %) and methyl ethyl ketone (28.5 wt. %) at room temperature. The varnishes prepared using advanced epoxy resins 6, 9 and 10 further include tetraphenolethane (1,1,2,2-tetra-(4-hydroxyphenyl)-ethane). Varnish Examples 3-2, 7 and 8 are cured using a bisphenol A novolac (SD-500 C from Borden Chemical) resin solution instead of the dicyandiamide hardener solution. Proportions of the various ingredients used to make the varnishes are as indicated in Table 3.

The reactivity of the varnish is evaluated by reacting the varnish on the surface of a 140° C. hot plate, and measuring the time required for the varnish to gel. Results are as indicated in Table 3.

For comparison, a varnish (Comparative Sample C-1) is prepared using 100 parts by weight of a commercial brominated, advanced epoxy resin. The varnish also contains 3.2 parts of dicyandiamide and 0.1 parts of 2-ethyl-4-methyl imidazole. The reactivity of this varnish is as indicated in Table 3.

TABLE 3

| | Varnish Sample No. | | | | | | | | | |
|---|---|---|---|---|---|---|---|---|---|---|
| | 3-1 | 3-2 | 4-1 | 5-1 | 6-1 | 7-1 | 8-1 | 9-1 | 10-1 | Comp. Sample C-1* |
| Components (pbw, solids basis) | | | | | | | | | | |
| Advanced Resin Example 3 | 100 | 100 | 0 | 0 | 0 | 0 | 0 | 0 | 0 | 0 |
| Advanced Resin Example 4 | 0 | 0 | 100 | 0 | 0 | 0 | 0 | 0 | 0 | 0 |
| Advanced Resin Example 5 | 0 | 0 | 0 | 100 | 0 | 0 | 0 | 0 | 0 | 0 |
| Advanced Resin Example 6 | 0 | 0 | 0 | 0 | 100 | 0 | 0 | 0 | 0 | 0 |
| Advanced Resin Example 7 | 0 | 0 | 0 | 0 | 0 | 100 | 0 | 0 | 0 | 0 |
| Advanced Resin Example 8 | 0 | 0 | 0 | 0 | 0 | 0 | 100 | 0 | 0 | 0 |
| Advanced Resin Example 9 | 0 | 0 | 0 | 0 | 0 | 0 | 0 | 71.43 | 0 | 0 |
| Advanced Resin Example 10 | 0 | 0 | 0 | 0 | 0 | 0 | 0 | 0 | 71.92 | 0 |
| D.E.R. 592 A 80 | 0 | 0 | 0 | 0 | 0 | 0 | 0 | 0 | 0 | 100 |
| Boric acid | 0.5 | 0 | 0.25 | 0.25 | 0.3 | 1.76 | 0.39 | 0.571 | 0.575 | 0 |
| Bis A Novolac | 0 | 0 | 0 | 0 | 0 | 100 | 43 | 0 | 0 | 0 |
| Dicyandiamide | 4 | 0 | 4 | 4 | 4 | 0 | 0 | 0 | 0 | 3.2 |
| Bisphenol A novolac | 0 | 45.1 | 0 | 0 | 0 | 74.87 | 54.85 | 0 | 0 | 0 |
| Phenol novolac resin | 0 | 0 | 0 | 0 | 0 | 0 | 0 | 24.75 | 25.2 | 0 |
| Tetraphenol ethane | 0 | 0 | 0 | 0 | 1.1 | 0 | 0 | 2.75 | 2.8 | 0 |
| TBBA | 0 | 0 | 0 | 0 | 0 | 45.23 | 0 | 0 | 0 | 0 |
| 2ethyl-4-methyl imidazole | 0.15 | 0.05 | 0.13 | 0.16 | 0.12 | 0 | 0 | 0 | 0 | 0.1 |
| 2-methyl imidazole | 0 | 0 | 0 | 0 | 0 | 0 | 0 | 0.08 | 0.08 | 0 |

TABLE 3-continued

| | Varnish Sample No. | | | | | | | | | |
|---|---|---|---|---|---|---|---|---|---|---|
| | 3-1 | 3-2 | 4-1 | 5-1 | 6-1 | 7-1 | 8-1 | 9-1 | 10-1 | Comp. Sample C-1* |
| 2-Phenylimidazole | 0 | 0 | 0 | 0 | 0 | 0.48 | 0.29 | 0 | 0 | 0 |
| Gel time at 170° C., s | 211 | 212 | 245 | 250 | 217 | 276 | 235 | 233 | 211 | 265 |

*Not an example of the invention.

Prepregs are prepared from the above varnish formulations by a dipping method, using a substrate of glass cloth (Type 7628 from Porcher Textile, Badinieres, Fr-38300 Bourgoin-Jallieu France or Interglas Textil GmbH, Ulm/Donau, Germany). The impregnated substrates are passed through a CARATSCH™ pilot treater (built by Caratsch AG, Bremgarten, Switzerland) having a 3 meter horizontal oven, at an air temperature of from 170 to 175° C. and a winding speed of from 1 to 1.6 meters per minute.

The resin content of each prepreg is measured by weighing 10 cm×10 cm square sheets of glass cloth before and after prepreg production, according to Method IPC-L-109B, IPC-TM-650:2.3.16 (available from the Institute for Interconnecting and Packaging Electronic Circuits, Lincolnwood, Ill., USA.) The results are as shown in Table 4 below.

Eight sheets of each prepreg are laid-up in alternating layers with sheets of copper foil on outer layers, and then heated under pressure to form an electrical laminate. The properties of the laminates are as indicated in Table 4 below.

than the $T_g$ of the Comparative Sample, due to the use of a different hardener. Note that the $T_g$ of Examples 7-2 and 8-2 exceed that of the Comparative Sample despite the use of the different hardener.

What is claimed is:

1. A process comprising forming a reaction mixture containing a stoichiometric excess of at least one halogenated epoxide-reactive compound and at least one halogenated epoxy resin in the presence of a solvent, and subjecting the reaction mixture to conditions sufficient to consume the epoxy groups of the halogenated epoxy resin to form a solution of an oligomer composition in the solvent, wherein the oligomer composition has a number average molecular weight of from 700 to 3200 and a weight average molecular weight of from 1500 to 7000 and contains at least 2.0 terminal epoxide-reactive groups per molecule.

2. The process of claim 1 wherein the halogenated epoxide-reactive compound contains at least one bromine atom.

TABLE 4

| | Ex. No. | | | | | | | | | |
|---|---|---|---|---|---|---|---|---|---|---|
| | 3-3 | 3-4 | 4-2 | 5-2 | 6-2 | 7-2 | 8-2 | 9-2 | 10-2 | C-2* |
| Prepreg properties | | | | | | | | | | |
| Residual gel time, s | 46 | 57 | 62 | 30 | 89 | 33 | 64 | 79 | 67 | 113 |
| Resin content, % | 50 | 47 | 45 | 43 | 40.8 | 70 | 95 | 46 | 44 | 46 |
| Laminate properties | | | | | | | | | | |
| Laminating conditions, ° C./min | 190/90 | 190/90 | 185/60 | 190/60 | 185/60 | 206/90 | 220/90 | 200/90 | 200/90 | 190/60 |
| Thickness, (mm) | 1.67 | 1.61 | 1.69 | 1.63 | 1.75 | 1.68 | 1.72 | 1.64 | 1.62 | 1.65 |
| $T_g$ by DSC, ° C. | 185/180 | 152/157 | 167/169 | 174/178 | 172/177 | 196/198 | 172/173 | 176/174 | 173/173 | 166/164 |
| $T_g$ by DMTA, ° C. | 218 | 180 | 201 | 214 | 203 | ND | 213 | ND | ND | 190 |
| T260, min. | 19 | >70 | 27 | 30 | 18 | >60 | >60 | ND | ND | 8 |
| T288, min | ND | ND | ND | ND | ND | ND | ND | 41 | 41 | ND |
| T300, min. | ND | ND | ND | ND | ND | 22.6 | 17 | ND | ND | ND |
| Solder dip at 288° C., s | 106 | 310 | 109 | 102 | ND | ND | >300 | ND | ND | 50 |
| $T_d$ by TGA, ° C. | 317 | 369 | 325 | 321 | 317 | 362 | 361 | 362 | 361 | 285 |
| Copper peel strength, (N/cm) | 16 | 14 | 15 | 15 | 18 | 14 | 12.3 | 13.9 | 14.9 | 15 |
| Pressure cooker test, 180 minutes, pass rate (water absorption) | 100% | 100% | ND | ND | ND | 100% pass (0.34) | 100% (0.3) | 100% passed 120 min. (0.36) | 100% passed 120 min. (0.36) | 100% passed 120 min. (0.36) |
| UL 94 rating | V-0 | V-0 | V-0 | V-0 | V-0 | V-0 (14 s) | V-0 (23 s) | ND | V-0 | V.0 |
| $D_k$ (1 MHz) | ND | ND | ND | ND | ND | ND | 4.2 | ND | ND | 4.6 |
| $D_k$ (1 GHz) | ND | ND | ND | ND | ND | ND | 3.9 | ND | ND | 4.3 |
| $D_f$ (1 MHz) | ND | ND | ND | ND | ND | ND | 0.0129 | ND | ND | 0.0146 |
| $D_f$ (1 GHz) | ND | ND | ND | ND | ND | ND | 0.0164 | ND | ND | 0.0120 |

*Not an example of the invention.
ND = not determined.

The data in Table 4 shows that the prepregs and laminates made from the compositions of the present invention exhibit much better thermal stability (T260, solder dip, $T_d$) than those made from the Comparative Example. Cured laminate $T_g$ is higher for Examples 3-3 and 4-2 through 10-2 than for the Comparative Sample That of Sample 3-2 is somewhat lower 3. The process of claim 2 wherein the halogenated epoxy resin contains at least one bromine atom.

4. The process of claim 3 wherein the halogenated epoxide-reactive compound is a phenolic compound having at least 2 epoxide-reactive groups and at least one bromine atom bonded to a carbon atom on an aromatic ring.

5. The process of claim 4 wherein the halogenated epoxy resin contains at least one bromine atom bonded to a carbon atom of an aromatic ring.

6. The process of claim 1 wherein the reaction mixture further contains at least one non-halogenated epoxy resin.

7. The process of claim 6 wherein at least 95% by weight of the epoxy resins in the reaction mixture contain 2 epoxy groups/molecule.

8. The process of claim 7 wherein at least 95% by weight of the epoxide-reactive compounds in the reaction mixture contain 2 phenol groups/molecule.

9. The process of claim 1 wherein the reaction mixture further contains at least one non-halogenated epoxy-reactive compound.

10. The process of claim 1 wherein the oligomeric composition contains from 10 to 60% by weight halogen atoms.

11. The process of claim 10 wherein the halogenated epoxide-reactive compound is a brominated bisphenol, and the halogenated epoxy resin is a diglycidyl ether of a halogenated bisphenol.

12. The process of claim 1 wherein the solvent constitutes from 10 to 75% of the combined weight of the solvent, epoxide-reactive compound(s) and epoxy resin(s).

13. The process of claim 1, further comprising mixing the oligomer solution with at least one additional epoxy resin and subjecting the mixture to conditions sufficient to form an advanced, halogenated epoxy resin.

14. The process of claim 13, wherein the additional epoxy resin is not halogenated.

15. The process of claim 14, wherein the additional epoxy resin has an average functionality of at least 2.0 epoxide groups per molecule.

16. The process of claim 15, wherein the additional epoxy resin is a glycidyl ether of a polyhydric phenol compound, a diglycidyl ether of an aliphatic glycol, a diglycidyl ether of a polyether glycol, a cresol-formaldehyde novolac epoxy resin, a phenol-formaldehyde novolac epoxy resin, a bisphenol A novolac epoxy resin, tris(glycidyloxyphenyl)methane, tetrakis(glycidyloxyphenyl)ethane, or a mixture of any two or more thereof.

17. The process of claim 16, wherein the additional epoxy resin is a glycidyl ether of resorcinol, catechol, hydroquinone, bisphenol, bisphenol A, bisphenol AP, bisphenol F or bisphenol K.

18. The process of claim 16 further comprising curing the advanced, halogenated epoxy resin by reacting it with at least one epoxy curing agent.

19. The process of claim 13 further comprising curing the advanced, halogenated epoxy resin by reacting it with at least one epoxy curing agent.

20. A varnish comprising a solution of an advanced, halogenated epoxy resin produced in accordance with claim 13, and at least one epoxy curing agent.

21. The varnish of claim 20, further comprising at least one other epoxy resin.

22. The varnish of claim 21, further comprising boric acid or a boron ester.

23. A prepreg comprising a substrate material impregnated with the varnish of claim 22.

24. A prepreg comprising a substrate material impregnated with the varnish of claim 20.

25. The varnish of claim 21, wherein the additional epoxy resin used to make the halogenated, advanced epoxy resin is a glycidyl ether of a polyhydric phenol compound, a diglycidyl ether of an aliphatic glycol, a diglycidyl ether of a polyether glycol, a cresol-formaldehyde novolac epoxy resin, a phenol-formaldehyde novolac epoxy resin, a bisphenol A novolac epoxy resin, tris(glycidyloxyphenyl)methane, tetrakis(glycidyloxyphenyl)ethane, or a mixture of any two or more thereof.

26. A varnish comprising a solution of an oligomer composition produced in accordance with claim 1, an epoxy resin, and at least one epoxy curing agent.

27. A prepreg comprising a substrate material impregnated with the varnish of claim 26.

* * * * *